UNITED STATES PATENT OFFICE.

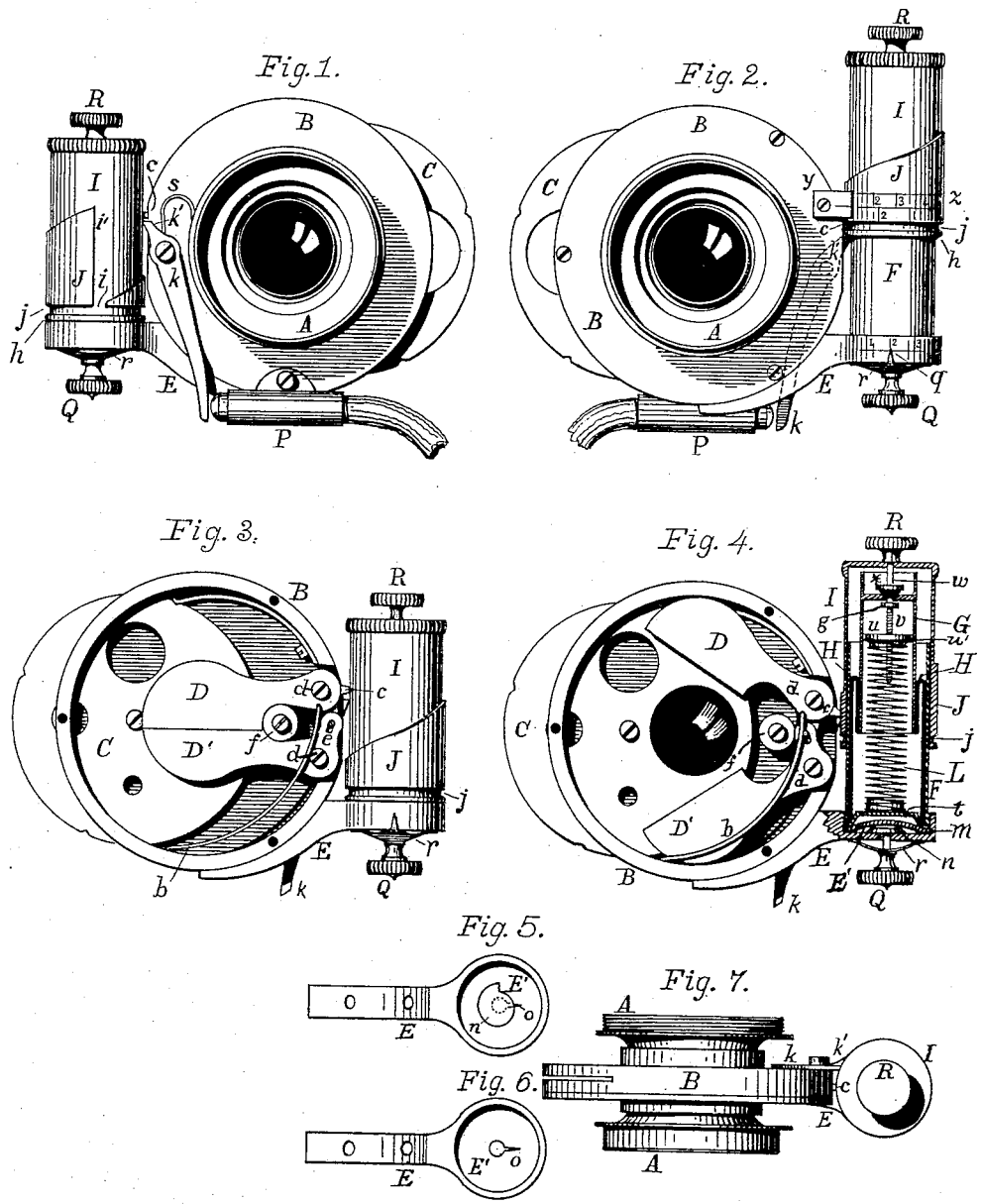

ASBURY BARKER, OF PEEKSKILL, NEW YORK.

CAMERA-SHUTTER.

SPECIFICATION forming part of Letters Patent No. 477,588, dated June 21, 1892.

Application filed November 24, 1890. Serial No. 372,421. (No model.)

*To all whom it may concern:*

Be it known that I, ASBURY BARKER, a citizen of the United States, residing at Peekskill, in the county of Westchester and State of New York, have invented an Improvement in Apparatus for Regulating the Action of Camera-Shutters, of which the following is a specification.

The object of my invention is to provide a timing-shutter for photographic cameras whereby the time of exposure may be accurately regulated and the lens-aperture opened and closed without shock or such jarring as would affect the view being taken and in such a manner that all parts of the picture will be equally timed; and it further has for its object to provide a device that is simple and cheap in construction, reliable in operation, and not liable to get out of order; and to these ends it consists in certain novelties of construction and combinations of parts, all as will be hereinafter fully described, and the novel features pointed out in the claims at the end of this specification.

In the accompanying drawings, Figure 1 is a rear view of a lens-tube with the shutter and controlling device attached; Fig. 2, a front view of the same, showing the shutter set ready for an exposure; Fig. 3, a front view with the front lens and cover for the shutter-chamber removed; Fig. 4, a view similar to Fig. 3, with the shutter-regulator in section, the parts being in the position assumed when the shutter is open and an exposure being made. Figs. 5 and 6 are views of the lower valve of the regulator and its seat; Fig. 7, a top view of the lens-tube and attachment.

Similar letters of reference in the several figures denote similar parts.

A represents a lens-tube adapted to be fitted to a camera in the ordinary manner, having an enlarged chamber B, which receives the diaphragm C and the shutter members D, consisting of semicircular parts pivoted at $d$ $d$, arranged to overlap somewhat when closed, as in Fig. 3, and connected, as at $e$, so as to cause their simultaneous movement when one is operated, said members being normally kept closed by a spring $b$, connected to the casing and in contact with one of them.

$f$ indicates a rubber cushion held in place by a tapering screw-head, so that by its adjustment the size of the cushion may be changed, said cushion preventing noise and jar when the shutter closes.

E indicates a bracket attached to the enlarged part of the lens tube or casing B and which supports the cylinder F, the latter standing, preferably, in a vertical position at the side of the lens-tube. Over the cylinder F is loosely fitted a sleeve I, capable of a free vertical sliding movement and also a rotary movement.

The sleeve I is provided with a head at its upper end and is shown in its lowest or normal position in Figs. 1 and 3, its highest position in Fig. 2, and midway in the act of descending in Fig. 4. Passing through the head of sleeve I is a stem $w$, to which a milled head R is attached, the lower part $v$ of this stem being threaded and screwing into a disk $u$, and to the disk is secured one end of a spring L, the other end being fastened to a bridge-piece $t$, arranged at the bottom of cylinder F. When the sleeve I is pulled up to the position shown in Fig. 2, it puts the spring L under tension, the latter tending to pull it down; but a spring-pressed pawl $k'$ falls into position under the lower edge of the sleeve and holds it up. An extension $k$ of the pawl forms a lever by which it may be tripped when desired to make an exposure by the usual means of a pneumatic device operated by hand and partially shown at P.

The sleeve I is arranged close to a lug or arm $c$, formed on one of the shutter members, but does not quite touch it, and the vertical movement would have no effect on the shutter but for a raised triangular cam-plate J on the sleeve I, which may be formed integral with or consist of a separate plate secured to it. The upper edge of this surface forms a spiral line or edge extending nearly around the sleeve, while its lower edge reaches not quite to the rim $h$ at the bottom, leaving the groove $j$. The position of the upper shutter member and its lug $c$ is such that the latter cannot move upward when the shutter members are together, but only downward, this movement causing the shutters to open, and as the plate J is high enough to engage with the lug $c$ the latter would prevent the upward movement of the sleeve were it not for the slot or opening $i$, Fig. 1, which allows the tripping-plate J to pass above the lug. When it is desired to raise the sleeve, therefore, it is necessary to rotate it until the opening $i$ is in line with the lug $c$, which may be accurately determined by rotating the tube until the lug $c$ is against the straight vertical edge of plate J. When tube I is raised to its upper position, the distance being limited by the rim $h$ coming in contact with lug $c$, the pawl $k'$ holds it there, as shown in Fig. 2. Now if the sleeve is rotated and the lever $k$ is tripped the sleeve being operated upon by the spring L at once descends and the lower end of plate J at once operates the lug $c$ and opens both shutter members, and they will remain open during the descent until the upper edge leaves the lug, when the shutters will be instantly closed by the spring $b$. If the tripping-plate remained in contact with lug $c$ during the entire descent of I, the shutters would remain open that length of time, and it is readily seen that the relation of the time of exposure to the movement of the sleeve I depends on the vertical width of the plate J. This plate, therefore, is made of a varying vertical width, which causes its upper edge to form a spiral line around the tube, as shown, and the relative position the plate J bears to lug $c$ determines what portion of the time occupied in its descent the shutter shall be open. The two edges of the plate J form in effect shoulders or projections, one of which acts to open and the other to permit the closing of the shutter, and as by the rotation of the sleeve a greater or lesser space intervenes they are practically adjustable toward and from each other.

The index $y$ on the casing B and the scale $z$, formed on the plate J, enables the latter to be set so that the time of the exposure can be determined—as, for instance, if the sleeve I descends in five seconds the exposure, according to the rotative position of J, may be the same or any fraction desired.

The action of a spring cannot well be relied upon alone to regulate the time of the movement of the sleeve, as its operation is uncertain and usually too quick where more than a momentary exposure is desired, and to make it possible to extend the time even to several minutes, if desired, I provide the regulating devices hereinafter described. These devices form a pneumatic regulating arrangement forming, broadly, the subject-matter of a pending application, Serial No. 354,189, filed by me June 3, 1890.

In Fig. 4 is shown in section the arrangement of the parts of the regulating device. The cylinder F, which affords support for the sleeve I, is mounted in a socket E' in the bracket E, and within the cylinder is arranged a hollow plunger G, somewhat smaller and connected to the cylinder by a flexible diaphragm H, which forms an air-tight joint or packing between the two almost entirely devoid of friction. In the upper end of the plunger G is a valve-seat, with which co-operates a valve $x$, connected to the spindle $w$, on which latter is mounted the head R, and when the sleeve I is raised air is admitted into the hollow plunger by the lifting of the valve from its seat. The valve is allowed only a very slight opening from its seat, as it is limited by the collar $g$, secured to the rod, which strikes the under surface of the valve-seat. The disk $u$, to which the spring L is attached, fits loosely in the hollow plunger; but a spline $u'$ prevents its turning, and therefore turning the spindle $w$ by means of the head R varies the tension of the spring L. When the sleeve I is pulled upward from the position of Fig. 3 to that of Fig. 2, it also raises the plunger G, the valve $x$ opening slightly in the operation, letting air into the plunger and cylinder, and spring L is placed under tension, the sleeve being, as described, retained by the pawl $k'$ and the valve $x$ held closed to its seat. Now if the lever $k$ is tripped the spring will tend to draw the sleeve downward, and as soon as the pressure of the confined air equals the tension of the spring the downward motion will stop, unless the air is allowed to escape. An opening is therefore provided capable of very accurate adjustment, which allows the air to escape at a determinate rate, and thus regulates the descent of the plunger and sleeve I. The escape-valve is preferably located at the bottom of the cylinder F in a socket E', formed in the bracket E, into which the cylinder is fitted, as shown in Figs. 5 and 6. This socket is provided with an opening for the stem of the valve to pass through and also a small wedge-shaped opening $o$.

An eccentric disk $n$, fitted air-tight on the bottom of socket E', forms the valve and covers more or less of the opening $o$, according to its rotative position. The stem of the valve passes through the bottom of socket E' and receives a milled head Q, by which it may be rotated, the spring-washer $r$ co-operating with the head Q and serving to hold the disk $n$ to its seat.

$q$ indicates a pointer co-operating with a scale on the bracket, serving to indicate the position of the valve. Placed immediately over the valve $n$ is a diaphragm $m$ of some porous material (some kinds of leather or chamois-skin answer the purpose well) that allows the passage of air to the small opening $o$, but prevents its being clogged by dust. As the air always passes outward through $o$, there is no tendency of dirt to collect on the outside. It will now be understood that while the exposure due to the action of the shutters can be made to bear almost any relation to the time occupied by the sleeve I in its descent the time of said descent can also be regulated, for while with the valve $n$ wide open it will be very quick the latter can be set as to require several minutes in descending, and it will be apparent that the number of variations in the length of exposure is practically unlimited within the time occupied by the tube's descent. Owing to the great diminution in friction the uniformity of action at any set time is almost perfect. If the valve $n$ is set at any one mark on the scale with which its pointer co-operates, the time of the descent of the sleeve can be varied by turning the head R, thereby varying the tension of spring L, and therefore it is easy to give any definite value to the figures on the bottom scale, the figures of the scale on J then indicating certain fractions of the former.

The lug $c$ by which the shutters are opened is so near the fulcrum $d$ that both the opening and closing of the shutter is very sudden, no matter how long the interval between the two actions.

While I produce a simple and compact device by placing the plate J around the sleeve, I do not wish to be confined to this construction, for it could well be located elsewhere, and also the construction and location of the operating-spring L could be changed, without departing from the spirit of my invention.

It will be understood that the term "light-excluding medium or shutter proper" used in the claims is intended to mean either the preferred form of shutter shown consisting of two co-operating members or any other form which performs the function of opening the lens-aperture and closing it again, and also that the plate governing the movement of the shutter comprehends a shutter-actuating plate of varying width, the tapering plate being a type in which the variations are gradual and the distance between the edges or shoulders gradually increases, which form for obvious reasons I prefer.

What I claim, and desire to secure by Letters Patent, is—

1. The combination, with the light excluding medium or shutter proper, of the progressively-moving plate of varying width engaging with and operating the shutter in one direction, said plate being adjustable relative to the shutter, whereby the length of the part actuating the shutter may be changed, substantially as described.

2. The combination, with the light-excluding medium or shutter proper, of the progressively-moving plate having shoulders or edges for engaging the shutter, arranged at varying distances apart, said plate being adjustable relative to the shutter, whereby the distance between the portions of the shoulders operating the shutter may be changed, substantially as described.

3. The combination, with the shutter proper, of the progressively-moving plate adjustable relative to the shutter, having shoulders or edges for co-operating with the shutter arranged at varying distances apart in the plane in which it moves, a pneumatic retarding device for regulating the movement of the plate, and an adjustable valve for regulating the operation of the retarding device, substantially as described.

4. The combination, with the shutter proper, of the progressively-moving plate of varying width adjustable relative to the shutter and co-operating therewith to open and maintain it open during its movement and a pneumatic retarding device for regulating the movement of the plate, substantially as described.

5. The combination, with the shutter proper, of the progressively-moving plate of varying width co-operating with and actuating the shutter and adjustable relative thereto and an index for denoting the portion of the plate co-operating with the shutter for regulating the length of the exposure, substantially as described.

6. The combination, with the shutter proper, of the adjustable plate of varying width co-operating with the shutter, a cylinder, a plunger operating in the cylinder, the valve in the plunger connected with the plate, and the spring for retracting the plunger, substantially as described.

7. The combination, with the shutter, of the adjustable plate of varying width co-operating therewith, the cylinder having the exhaust-aperture, the plunger operating in the cylinder, connected with the latter by the flexible diaphragm, the valve in the plunger connected with the plate, and the spring for retracting the piston, substantially as described.

8. The combination, with the cylinder having the exhaust-aperture, the hollow plunger operating therein, the flexible diaphragm connecting the plunger and cylinder, the valve in the plunger and the spring for closing it and retracting the plunger, the outer sleeve, and the plate connected to said sleeve and co-operating with the stem of the valve, of the shutter co-operating with and actuated by the plate connected to the outer sleeve, substantially as described.

9. The combination, with the cylinder having the exhaust-port, the hollow plunger operating therein, the flexible diaphragm between the plunger and cylinder, the valve in the plunger, the spring connecting it with the cylinder, the outer sleeve connected with the valve, and a valve for regulating the exhaust-port, provided with an index, of a photographic shutter connected to the outer sleeve and operated by its movement, substantially as described.

10. The combination, with the shutter-casing and the shutter operating therein, having the projecting lug, and a spring for closing the shutter, of the bracket secured to the casing, the pneumatic regulator mounted on the bracket, embodying a movable plunger, and a connected plate co-operating with the lug on the shutter to open the shutter and maintain it open during the movement of the plunger, substantially as described.

11. The combination, with the shutter-casing and two shutter members therein connected for simultaneous operation in opposite directions, one of them having the projecting lug, of the pneumatic regulating device embodying a movable plate or cam-surface engaging the lug on the shutter and operating the shutter by its movement, substantially as described.

12. The combination, with the shutter having the projecting lug, of the progressively-moving plate of varying width operating on said lug and capable of adjustment in one direction to regulate the length of surface acting on said lug, substantially as described.

13. The combination, with the shutter members connected for simultaneous movement in opposite directions, one of them having the projecting lug, of the progressively-moving cam-plate operating on said lug and capable of adjustment in one direction to regulate the length of surface operating on the shutter-lug, substantially as described.

14. The combination, with a shutter having the projecting lug, of the movable sleeve having the cam-plate thereon co-operating with the lug, the circumferential groove, and a catch for retaining said sleeve with the shutter-lug in the groove, substantially as described.

15. A pneumatic regulating device for photographic shutters, consisting of the following elements: a cylinder, an air-tight plunger operating therein, a valve permitting entrance of air on the outward movement of the plunger, an adjustable valve for regulating the escape of air during the inward motion of the plunger, a spring put under stress by the outward motion of the plunger, a shutter, and connections between the plunger and shutter, whereby the shutter is actuated by the movement of the plunger, substantially as described.

16. A regulating device for photographic shutters, consisting of a cylinder F, plunger G, flexible diaphragm H, ingress-valve $x$, egress-valve $n$, spring L, plate J, connected to plunger G, and a shutter provided with a lug $c$, substantially as described.

17. In a regulating device for photographic shutters, the plate J, of varying width, engaging and actuating the lug $c$ of the shutter and capable of adjustment as to the part of its width that engages the lug $c$, and the spring L, connected to the plate J, substantially as described.

18. In a regulating device for photographic shutters, the combination of the cylinder F, the sleeve I, adapted to freely turn and slide on the cylinder, having on its outer surface a shoulder adapted to engage with a lug attached to a shutter, the plunger G, spring L, and a shutter having a lug operating on the shoulder, substantially as described.

19. In a photographic shutter adapted to open and close a lens-aperture, the combination, with the shutter, the cylinder F, plunger G, and connections between said plunger and the shutter, of the flexible diaphragm H, spring L, screw $v$, disk $u$, and head R for adjusting the spring, substantially as described.

20. In a photographic shutter adapted to open, and close a lens-aperture, the combination, with the shutter, the cylinder F, having the wedge-shaped aperture $o$, the plunger G, and connections between the plunger and shutter, of the flexible diaphragm H, spring L, and the escape-valve consisting of the eccentric plate $n$, substantially as described.

21. In a photographic shutter adapted to open and close a lens-aperture, the combination, with the shutter, the cylinder F, having aperture $o$, plunger G, and connections between the latter and the shutter, of the diaphragm H, spring L, valve $n$, and the porous screen $m$, substantially as described.

22. In combination with a photographic shutter, a time-regulating device consisting of the cylinder F, plunger G, diaphragm H, spring L, ingress-valve $x$, egress-valve $n$, outer sleeve I, plate J, retaining-pawl $k'$ and lever $k$, and lug $c$ on the shutter, substantially as described.

ASBURY BARKER.

Witnesses:
C. L. ANDERSON,
C. A. SEARS.